United States Patent
Lee et al.

(10) Patent No.: US 9,279,068 B2
(45) Date of Patent: Mar. 8, 2016

(54) OPTICAL BONDING APPARATUS, TOUCH SENSITIVE DISPLAY USING THE SAME AND METHOD OF MAKING THE SAME

(75) Inventors: Yuh-Wen Lee, Hsinchu (TW); Qiong Yuan, Xinyu (CN); Xianbin Xu, Xiamen (CN); Fengming Lin, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 163 days.

(21) Appl. No.: 14/115,872

(22) PCT Filed: May 6, 2011

(86) PCT No.: PCT/CN2011/073759
§ 371 (c)(1),
(2), (4) Date: Feb. 4, 2014

(87) PCT Pub. No.: WO2012/151734
PCT Pub. Date: Nov. 15, 2012

(65) Prior Publication Data
US 2014/0139760 A1  May 22, 2014

(51) Int. Cl.
*C09J 7/02*  (2006.01)
*G06F 3/041*  (2006.01)
*B32B 37/26*  (2006.01)
*G02F 1/1333*  (2006.01)

(52) U.S. Cl.
CPC ............. *C09J 7/0207* (2013.01); *B32B 37/26* (2013.01); *G06F 3/041* (2013.01); *G02F 1/13338* (2013.01); *G02F 2202/28* (2013.01); *Y10T 156/10* (2015.01); *Y10T 428/2848* (2015.01)

(58) Field of Classification Search
CPC ..... G06F 3/041; G06F 3/0412; G06F 1/1626; G06F 1/1643; G06F 2203/04103; G02F 1/13338; G02F 2202/28; C09J 2433/00; C09J 2203/318; C09J 133/04; C09J 133/08; C09J 133/066; C09J 133/14; C09J 7/00; C09J 7/02; C09J 7/0217; C09J 7/0246; C09J 7/0296; C09J 4/00; C09J 4/06; C09J 5/00; C09J 123/22; C09J 2201/606; C09J 2201/622; C09J 2201/128; C09J 2205/31; C09J 175/16; C09J 175/04; B32B 7/12; B32B 2457/20; B32B 2457/208; B32B 2457/202; B32B 2310/0831; B32B 37/12; B32B 2037/1253; Y10T 156/10; Y10T 428/2848; C08G 18/672; C08G 18/48; C08G 18/755

See application file for complete search history.

(56) References Cited

U.S. PATENT DOCUMENTS

| | | | |
|---|---|---|---|
| 7,714,950 B2 * | 5/2010 | Yamazaki et al. | 349/45 |
| 2004/0038020 A1 * | 2/2004 | Murata et al. | 428/317.1 |
| 2004/0191509 A1 * | 9/2004 | Kishioka et al. | 428/354 |
| 2009/0091549 A1 * | 4/2009 | Matsumoto et al. | 345/173 |
| 2009/0229732 A1 * | 9/2009 | Determan et al. | 156/60 |
| 2012/0325402 A1 * | 12/2012 | Suwa et al. | 156/275.5 |

FOREIGN PATENT DOCUMENTS

| | | |
|---|---|---|
| CN | 201662668 | 12/2010 |
| JP | 2005277383 | 10/2005 |
| JP | 2009093397 | 4/2009 |

* cited by examiner

*Primary Examiner* — Nalini Mummalaneni
(74) *Attorney, Agent, or Firm* — Gokalp Bayramoglu

(57) ABSTRACT

The present invention discloses an optical bonding apparatus, including: a first bonding layer; a second bonding layer; and a dismountable bonding layer superposed between the first bonding layer and the second bonding layer. The present invention also discloses a touch sensitive display using the optical bonding apparatus and a method of making the optical bonding apparatus.

6 Claims, 3 Drawing Sheets

US 9,279,068 B2

OPTICAL BONDING APPARATUS, TOUCH SENSITIVE DISPLAY USING THE SAME AND METHOD OF MAKING THE SAME

BACKGROUND OF THE INVENTION

1. Field of the Invention

The present invention generally relates to bonding apparatus, and more particularly, to an optical bonding apparatus, a touch sensitive display using the same and a method of making the same.

2. Description of the Related Art

A touch sensitive display includes a touch panel for sensing touch points and a display panel for displaying contents. The touch panel and the display panel are bonded together by optical bonding apparatus.

Usually, the conventional optical bonding apparatus is single-layer structure. When the touch sensitive display is illuminated through a backlight source, there may be color blocks appearing on the display panel, such color blocks present yellow if the display's background is white and present white if the display's background is gray. The phenomenon described above is named mura. Mura is a very common defect in electronic devices with LCD or the like, and it always decreases the contrast ratio, forms inhomogeneous areas and makes the edge of images blurry. When a color block caused by Mura covers an area larger than a pixel, it will affect the image quality and therefore a user will have difficulty viewing images on the display.

A bonding apparatus with multiple bonding layers is used for bonding the touch panel and the display panel to help solving the above problem. For example, a multi-layered bonding apparatus is a composition superposed between pressure sensitive bonding layers and thermal flow bonding layers. However, the multi-layered bonding apparatus has a problem of disassembly, that is, the bonded layers are hard to be disassembled from each other. If the touch panel or the display panel encounters problem, the difficulty of disassembly will lead to the difficulty of rework on the touch panel or the display panel. Disassembly will cause damage to the touch panel or the display panel.

Thus, it is desired to provide an optical bonding apparatus, a touch sensitive display and a method of making the optical bonding apparatus that overcomes the above drawbacks of the conventional touch panels.

SUMMARY OF THE INVENTION

Accordingly, the present invention provides an optical bonding apparatus having a dismountable bonding layer that is easy to be disassembled from multiple bonding layers. One aspect of the present invention is to provide an optical bonding apparatus, including: a first bonding layer; a second bonding layer; and a dismountable bonding layer sandwiched between the first bonding layer and the second bonding layer.

Another aspect of the present invention is to provide a touch sensitive display, including: a touch panel; a display panel; and an optical bonding apparatus configured for bonding the touch panel and the display panel; wherein the optical bonding apparatus comprises a first bonding layer, a second bonding layer and a dismountable bonding layer disposed between the first bonding layer and the second bonding layer.

The third aspect of the present invention is to provide a method of making an optical bonding apparatus, including: superposing a dismountable bonding layer between a first bonding layer and a second bonding layer.

DETAILED DESCRIPTION OF THE INVENTION

The detailed description of the present invention will be discussed in the following embodiments, which are not intended to limit the scope of the present invention, and can still be adapted for other applications. While drawings are illustrated in details, it is appreciated that the quantity of the disclosed components could be greater or less than that disclosed, except those components with express restricting amount.

Figure 1:
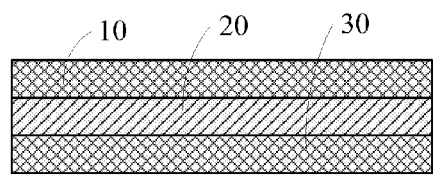
FIG. 1 is a cross-sectional view of an optical bonding apparatus according to an embodiment of the present invention.
Figure 2:
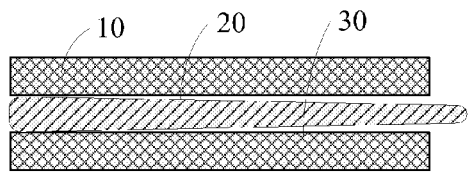
FIG. 2 is an exploded view of an optical bonding layer according to an embodiment of the present invention.

FIG. 1 is a cross-sectional view of an optical bonding apparatus according to an embodiment of the present invention. The optical bonding apparatus includes a first bonding layer 10, a second bonding layer 30 and a dismountable bonding layer 20 superposed between the first bonding layer 10 and the second bonding layer 30.

In the abovementioned optical bonding apparatus, the first bonding layer 10 and the second bonding layer 30 are OCA (Optically Clear Adhesives) for eliminating mura. The first bonding layer 10 and the second bonding layer 30 may be both thermal flow bonding layer, which are laminated on the rough surface of a touch panel or a display panel.

In an alternative embodiment, the first bonding layer 10 may be a pressure sensitive bonding layer, and the second bonding layer 30 may be a thermal flow bonding layer. The pressure sensitive bonding layer has viscidity while being in solid state at room temperature, and it is very sensitive to pressure. It can bond to the surface of a substrate while being pressed without the heating process, and it bonds tighter as the pressure increases. Typical pressure sensitive adhesives (PSA) are transparent adhesive tape, double sided adhesive tape or the like.

The dismountable bonding layer 20 can be a kind of OCA that is easy to be disassembled from the first bonding layer 10 and the second bonding layer 30 after being processed.

The extend-to-disassemble bonding layer includes a transformable substrate, while being disassembled, the dismountable bonding layer 20 is stretched from one end so that the shape of the substrate changes and the thickness decreases, two sides of the substrate are detached from the first bonding layer 10 and the second bonding layer 30 because of transformation.

The dismountable bonding layer 20 also may be an ultra violet exposing-to-disassemble bonding layer. While being disassembled, the ultra violet exposing-to-disassemble bonding layer can be exposed to ultra violet light for a period of time to make the OCA age so that the bond strength decreases or disappears.

Figure 3:
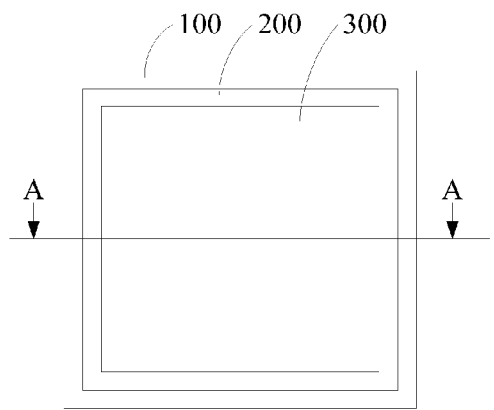
FIG. 3 is a top view of a touch sensitive display according to an embodiment of the present invention.
Figure 4:
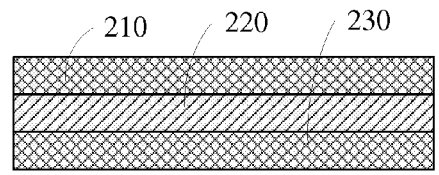
FIG. 4 is a cross-sectional view of the optical bonding layer taken along the cross section line A-A of FIG. 3.

FIG. 3 is a top view of a touch sensitive display according to an embodiment of the present invention. The touch sensitive display includes a touch panel 100, an optical bonding apparatus 200 and a display panel 300 which are successively superposed. FIG. 4 is a cross-sectional view of the optical bonding layer taken along the cross section line A-A of FIG. 3. The optical bonding apparatus 200 includes a first bonding layer 210, a second bonding layer 230 and a dismountable bonding layer 220 disposed between the first bonding layer 210 and the second bonding layer 230.

Figure 5:
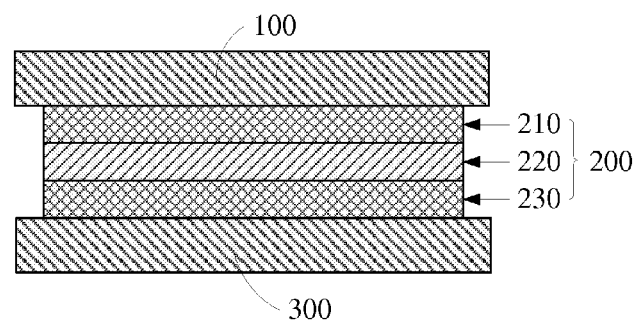
FIG. 5 is a cross-sectional view of FIG. taken along the cross section line A-A.

FIG. 5 is a cross-sectional view of FIG. 3 taken along the cross section line A-A. The first bonding layer 210 bonds to the touch panel 100 and the second bonding layer 230 bonds to the display panel 300. The display panel may be LCD panel, plasma panel, OLED panel or the like.

The first bonding layer 210 and the second bonding layer 230 may be both thermal flow bonding layer, being used to laminate on the rough surface of the touch panel 100 or display panel 300.

The thermal flow type material is in solid state at room temperature, and it turns into half-liquid, half-solid state and has higher viscidity as the temperature goes up to a certain value, while its chemical feature also changes. It can return to solid state by adopting additional process such as ultraviolet (UV) solidifying, heating solidifying, vacuum anaerobic solidifying and moisture solidifying.

In another embodiment, the first bonding layer 210 may be a pressure sensitive bonding layer, and the second bonding layer 230 may be a thermal flow bonding layer. The pressure sensitive bonding layer has viscidity while being in solid state at room temperature, and it is very sensitive to pressure. It can bond to the surface of a substrate while being pressed without heating process, and it bonds tighter as the pressure increases.

In an alternative embodiment, the first bonding layer 210 may bond to the display panel 300 and the second bonding layer 230 bond to the touch panel 100.

Figure 6:
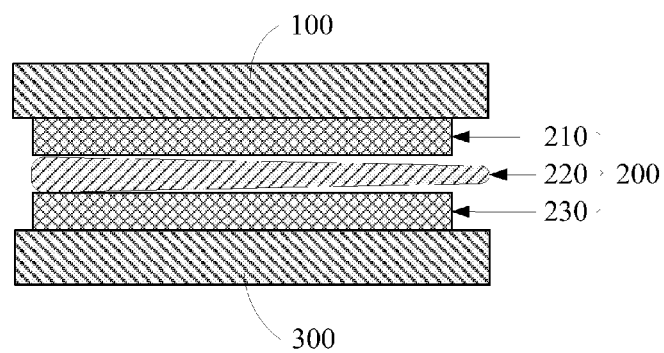
FIG. 6 is a schematic view of disassembling the optical bonding layer of FIG. 3.

FIG. 6 is a schematic view of disassembling the optical bonding layer of FIG. 3. The dismountable bonding layer 220 is a kind of OCA that is easy to be disassembled from the first bonding layer 210 and the second bonding layer 230 after being processed. The touch panel 100 and the display panel 300 could be detached from each other when the dismountable bonding layer 220 is disassembled, so that the touch panel 100 or the display panel 300 with problems proceeds to be reworked. After being reworked, the touch panel 100 and the display panel 300 are bonded together with new optical bonding apparatus of the present invention.

In this embodiment, the dismountable bonding layer 220 is an extend-to-disassemble bonding layer. The extend-to-disassemble bonding layer includes a transformable substrate, while being disassembled, the dismountable bonding layer 220 is stretched from one end so that the shape of the substrate changes and the thickness decreases, two sides of the substrate separate from the first bonding layer 210 and the second bonding layer 230 because of transformation.

In an alternate embodiment, the dismountable bonding layer 220 may be a heat-to-disassemble bonding layer. While being disassembled, the heat-to-disassemble bonding layer can be heated by a time period of high temperature to make the OCA age so that the bond strength decreases or disappears.

The dismountable bonding layer 220 also may be an ultra violet exposing-to-disassemble bonding layer. While being disassembled, the ultra violet exposing-to-disassemble can be exposed to a time period of ultra violet light to make the OCA age so that the bond strength decreases or disappears.

Figure 7:
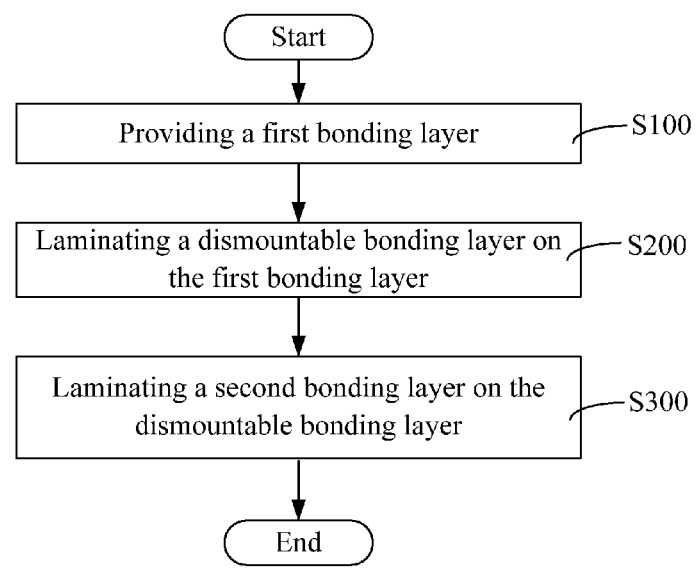
FIG. 7 is a flow chart of a method of making an optical bonding apparatus.

FIG. 7 is a flow chart of a method of making an optical bonding apparatus. The optical bonding apparatus has a dismountable bonding layer superposed between a first bonding layer and a second bonding layer. The method further includes:

In step S100, the first bonding layer is provided. The first bonding layer may be a pressure sensitive bonding layer. The pressure sensitive bonding layer has viscidity while being in solid state at room temperature, and it is very sensitive to pressure. It can bond to the surface of a substrate while being pressed without the heating process, and it bonds tighter as the pressure increases.

In another embodiment, the first bonding layer may be thermal flow bonding layer, and it is a kind of OCA for eliminating mura. The thermal flow type material is in solid state at room temperature, and it turns into half-liquid, half-solid state and has higher viscosity as the temperature goes up to a certain value, while its chemical feature also changes. It can return to solid state by adopting additional process such as ultraviolet (UV) solidifying, heating solidifying, vacuum anaerobic solidifying and moisture solidifying.

In step S200, the dismountable bonding layer is laminated on the first bonding layer. The dismountable bonding layer is a kind of OCA that is easy to be disassembled from the first bonding layer and the second bonding layer after being processed.

In one embodiment, the dismountable bonding layer is an extend-to-disassemble bonding layer. The extend-to-disassemble bonding layer includes a transformable substrate, while being disassembled, the dismountable bonding layer is stretched from one end so that shape of the substrate changes and the thickness decreases, two sides of the substrate separate from the first bonding layer and the second bonding layer because of transformation.

In an alternate embodiment, the dismountable bonding layer may be a heat-to-disassemble bonding layer. While being disassembled, the heat-to-disassemble bonding layer can be heated by a time period of high temperature to make the OCA age so that the bond strength decreases or disappears.

The dismountable bonding layer also may be an ultra violet exposing-to-disassemble bonding layer. While being disassembled, the ultra violet exposing-to-disassemble can be exposed to a time period of ultra violet light to make the OCA age so that the bond strength decreases or disappears.

In step S300, the second bonding layer is laminated on the dismountable bonding layer. The second bonding layer may be a thermal flow bonding layer.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

The invention claimed is:

1. A method of disassembling a display comprising:
providing a display comprising a touch panel module, a display panel module, and a dismountable bonding layer;
wherein the touch panel module comprises a touch panel and a first bonding layer attached to the touch panel, the display panel module comprises a display panel and a second bonding layer attached to the display panel, and wherein the dismountable bonding layer is capable of transforming from a first state to a second state after the dismountable bonding layer is processed, wherein two sides of the dismountable bonding layer are respectively bonded to the first bonding layer and the second bonding layer in the first state;

wherein the dismountable bonding layer is a heat-to-disassemble bonding layer and heating the dismountable bonding layer for a period of time until the dismountable bonding layer transforms from the first state to the second state, and wherein after the step of heating the heat-to-disassemble bonding layer, the first bonding layer remains bonded to the touch panel and the second bonding layer remains bonded to the display panel; and removing the dismountable bonding layer to separate the individual touch panel module and the display panel module;

wherein the first bonding layer is a thermal flow bonding layer and the first bonding layer transforms to a higher viscosity state during the step of heating and returned to solid state by heat solidifying.

2. The method according claim 1, wherein the second bonding layer is a thermal flow bonding layer, and the second bonding layer remains bonded to the display panel after the step of heating the dismountable bonding layer.

3. The method according claim 1, wherein the second bonding layer is a pressure sensitive bonding layer and the second bonding layer remains bonded to the display panel after the step of heating the dismountable bonding layer.

4. A method of disassembling a display comprising:

providing a display comprising a touch panel module, a display panel module, and a dismountable bonding layer; wherein the touch panel module comprises a touch panel and a first bonding layer attached to the touch panel, the display panel module comprises a display panel and a second bonding layer attached to the display panel, and wherein the dismountable bonding layer is capable of transforming from a first state to a second state after the dismountable bonding layer is processed, wherein two sides of the dismountable bonding layer are respectively bonded to the first bonding layer and the second bonding layer in the first state;

wherein the dismountable bonding layer is a an ultra violet exposing-to-disassemble bonding layer and exposing the dismountable bonding layer to ultra violet lights for a period of time until the dismountable bonding layer transforms from the first state to the second state, and wherein after the step of exposing the dismountable bonding layer, the first bonding layer remains bonded to the touch panel and the second bonding layer remains bonded to the display panel; and removing the dismountable bonding layer to separate the individual touch panel module and the display panel module;

wherein the first bonding layer is a thermal flow bonding layer and the first bonding layer transforms to a higher viscosity state during the step of exposing the dismountable bonding layer to ultra violet lights and returned to solid state by ultraviolet solidifying.

5. The method according claim 4, wherein the second bonding layer is a thermal flow bonding layer, and the second bonding layer remains bonded to the display panel after the step of exposing the dismountable bonding layer.

6. The method according claim 4, wherein the second bonding layer is a pressure sensitive bonding layer and the second bonding layer remains bonded to the display panel after the step of exposing the dismountable bonding layer.

\* \* \* \* \*